United States Patent [19]

Elliott

[11] 3,708,066

[45] Jan. 2, 1973

[54] INDEX CARD MEANS

[76] Inventor: Roy Lee Elliott, 2101 Woodland, Wichita, Kans. 67203

[22] Filed: Feb. 1, 1971

[21] Appl. No.: 111,432

[52] U.S. Cl...........209/80.5, 235/61.12 R, 209/110.5
[51] Int. Cl...........................................................B07c
[58] Field of Search.....209/80.5, 110.5; 235/61.12 R

[56] References Cited

UNITED STATES PATENTS

| | | | |
|---|---|---|---|
| 2,339,519 | 1/1944 | Rembold | 209/110.5 X |
| 2,515,424 | 7/1950 | Rembold | 209/110.5 X |

*Primary Examiner*—Allen N. Knowles
*Attorney*—John H. Widdowson

[57] ABSTRACT

An index card has a portion with a plurality of apertures and slots therethrough with corresponding portions to receive indicia corresponding to the plurality of apertures and slots. Another portion has indicia identifying indicia of the first portion with an associated second plurality of groups of apertures corresponding to indicia of the second portion. The index card is used in a system of similar index cards and indicia codes to identify, by collecting similar items, groups of information that are different yet have similarly classifiable characteristics.

6 Claims, 6 Drawing Figures

PATENTED JAN 2 1973

3,708,066

INVENTOR
ROY LEE ELLIOTT
BY
John H. Widdowson
ATTORNEY

INVENTOR
ROY LEE ELLIOTT
BY John H. Widdowson
ATTORNEY

PATENTED JAN 2 1973 3,708,066

INVENTOR
ROY LEE ELLIOTT

BY John H. Widdowson
ATTORNEY

INDEX CARD MEANS

In the prior art numerous indexes have been devised to catalogue band music. The prior indexes are adapted to classify music alphabetically by its title or catagorically by the type of music piece such as march, overture, etc. Other indexes classify the music pieces by difficulty and assign each piece a position within a range of comparative difficulty. These prior art indexes are operative to classify the music generally; however, they are not easily adapted to classify it so it can be easily retrieved for use by band teachers. Students of music are taught and learn in terms of notes, key signatures, time signatures and rhythmical notations; this does not correspond to any of the particular terms of the prior art indexes. Therefore, when a teacher desires for his students to play a new piece, he must tediously examine it to determine if it is within he capability of his students. Finding a piece of music within the playing capability of his students can be a very time-consuming and difficult task since the portion for one instrument may be within the students playing capability but the portion for another instrument may not be; and this determination can only be made after a careful examination of all portions of the music. The indexes which classify music according to difficulty do not specify each individual portion of the piece of music according to difficulty; they classify it generally so a piece may be moderately easy overall but may be easier or more difficult for some particular instruments.

In one preferred specific embodiment of this invention a music index card is provided which is adapted to index music by notations of the title, composer and other general information; it is also adapted to index information concerning the range of notes, key and time signatures and rhythmical notations for several instruments normally used to play the piece in a band. The index card is preferably constructed from a rectangular card having a plurality of pre-punched apertures therethrough arranged in columns perpendicular to one long edge and row of apertures along the opposite edge. The apertures are adapted to be interconnected to form slots in the card. The card is initially provided with indicial markings to identify general information relative to the data on the card and has some portions thereof labeled which are of a standard identity and would be similarly reproduced and used on a plurality of such index cards. The card is also provided with a plurality of portions having musical stave markings thereon adapted to be correspondingly labeled with a similar number of columns of the apertures. Additionally, a portion of the apertures and slots in conjunction with a code are adapted to provide a means to identify the general information on the card. One index card is preferably used to display pertinent information of one piece of music written for several instruments, such as band and orchestra music. A plurality of the cards each identifying a different piece of music are preferably to be used by music instructors in selecting music for their particular need. The index cards in mass constitute a system of some containing musical information on a large number of pieces of music that serve as an indexed library from which musical scores can easily be drawn regarding their relative difficulty for a particular instrument or for a particular type arrangement or for a particular composer, book, publisher and arranger, or they may be separated by specific range, key and time signatures and rhythmical notations.

One other object of this invention is to provide an index card and system usable to display several characteristic items of data about different groups of data, the cards adapted for easy retrieval according to the several data characteristics of the larger groups of data.

Yet, another object of this invention is to provide a music index card adapted to display information about a piece of music; specifically general information about the type of arrangement, composer, etc., other information about the key and time signatures, rhythmical notation and range of notes included in the piece which several specific instruments must play in order to play that piece of music.

Still another object of this invention is to provide a music index card having a plurality of apertures therethrough and a plurality of slots adjoining the apertures adapted for use with codes to provide sorting of a mass of cards according to some desired information.

Still one further object of this invention is to provide a system of music index cards easily sortable according to some any particular portion of the information displayed thereon; specifically the system of cards can be sorted according to any portion of the general information regarding the title, composer, book, publisher, type of arrangement, also any portion of the other information as key and time signatures, notation and range of difficulty of the portion for a particular instrument.

Various other objects, advantages, and features of the invention will become apparent to those skilled in the art from the following discussion, taken in conjunction with the accompanying drawings, in which.

Figure 1:
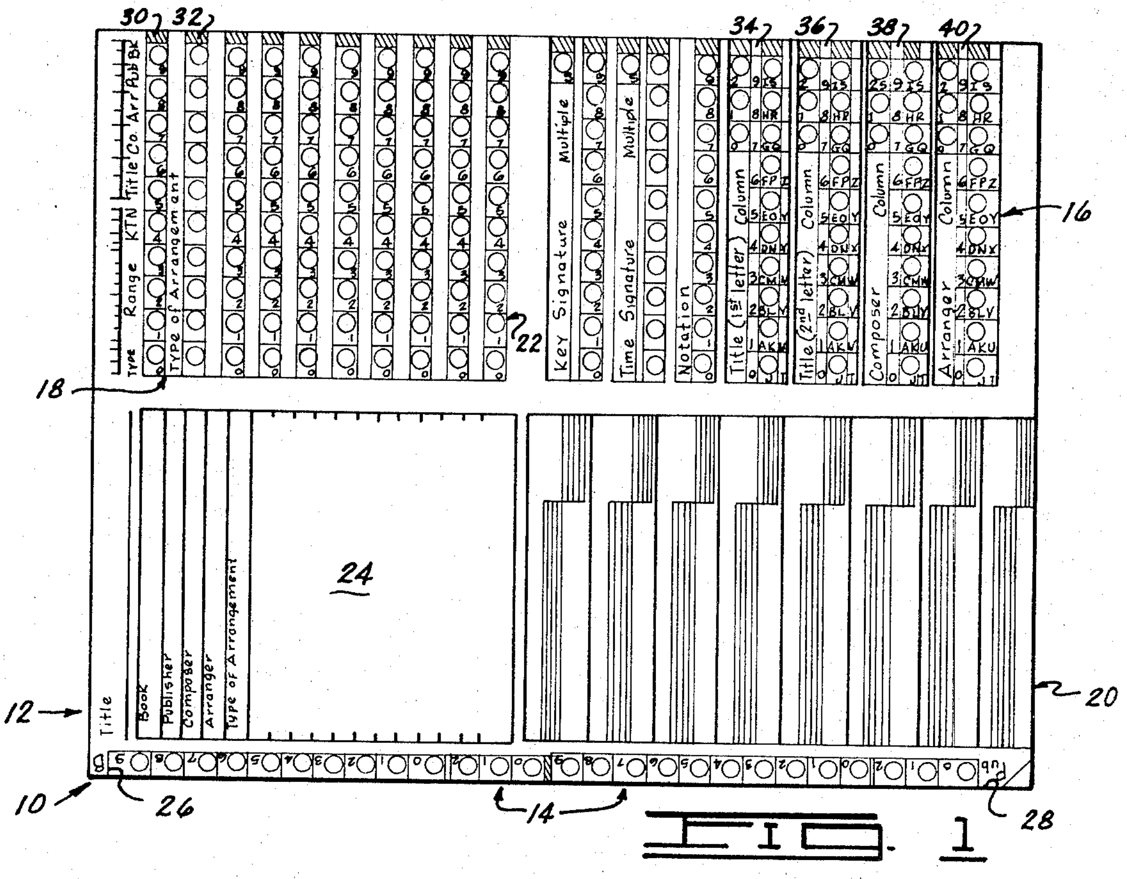
FIG. 1 is a plan view of the face side of a blank music index card.

The following is a discussion and description of preferred specific embodiments of the new index card means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIG. 1, a blank music index card of this invention, generally indicated at 10, is shown therein. The blank music index card 10 includes a general information portion indicated at 12, and corresponding groups of apertures along the edges of the card indicated by 14, 16 and 18. A characteristic portion of the music index card includes a plurality of stave markings and labeling spaces, indicated at 20, and a corresponding plurality of columns of apertures and labeling spaces, indicated at 22, adapted to display range level characteristics of several selected instrument parts of the indexed musical composition. An alphabetical code system is used to link the information of the general information portion and the characteristics portion to the groups of apertures 14, 16 and 18.

The music index card 10 is preferably constructed from a rectangularly shaped card and has the original and permanent markings thereon as shown in FIG. 1 which will be described in detail in the hereafter. The general information portion 12 includes labels and spaces to receive the title of the musical composition to be indexed on that particular music index card 10, also other related information including title of the book from which it came, publisher of the book, name of the composer of the musical composition, name of the arranger of the musical composition and the particular type of arrangement the musical composition is, march, ensemble, solo, full band, etc. Below the above named spaces is a blank portion, indicated at 24, adapted to receive information not indexable in the remainder of the index card and any other notational information. The apertures corresponding to the general information portion 12 are those on the edge of the card at 14 and a portion of the others at 16 and 18. The edge apertures of the card 14 preferably note the book from which the music came and the publisher of the book, indicated at 26 and 28. These can also be used to note the publisher of the piece of music if it did not come from a book. The type of arrangement is indicated in the first two columns of apertures, indicated at 30 and 32 of the group of apertures indicated at 18. The title, composer and arranger are represented in the lower eight columns of apertures of the group indicated at 16; the title is represented at 34 and 36, composer at 38 and arranger at 40.

Figure 5:
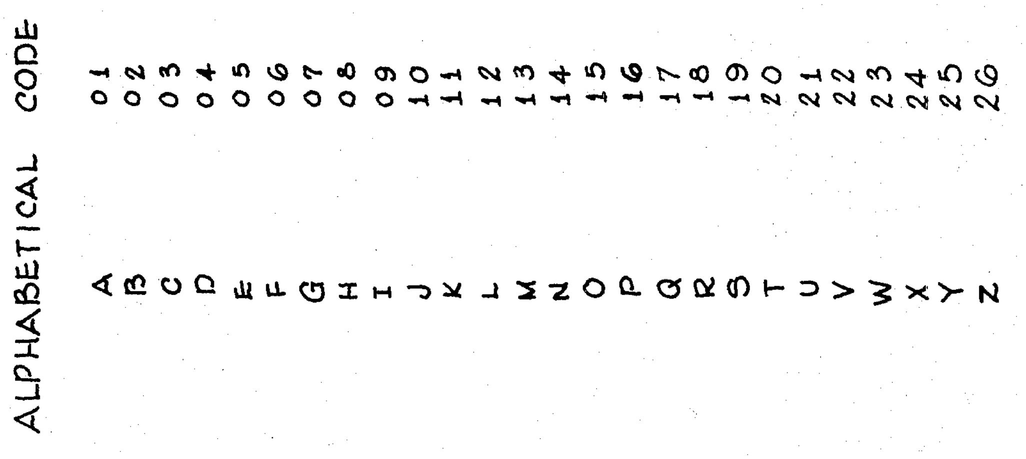
FIG. 5 is a listing of the alphabetical code used with the music index card.

The alphabetical code used to relate the general information portion 12 is indicated in FIG. 5; it is a simple progressive numbering of the alphabet from one, to 26. Use of this code requires two numerals to depict a letter thus two columns of apertures one used in the index card for each letter depicted. In practice it has been found more convenient to depict the first two, letters of the title of the piece of music as indicated at 34 and 36 and to depict only the first letter of the names of the book, publisher, composer and arranger as indicated at 26, 28, 38 and 40, respectively. Also the type of arrangement can be depicted in a similar manner as indicated by the two columns of apertures 30 and 32; however, it has not been determined in practice just what is the most convenient to index about the type of arrangement for all configurations since second types have similar first letters.

Figure 2:
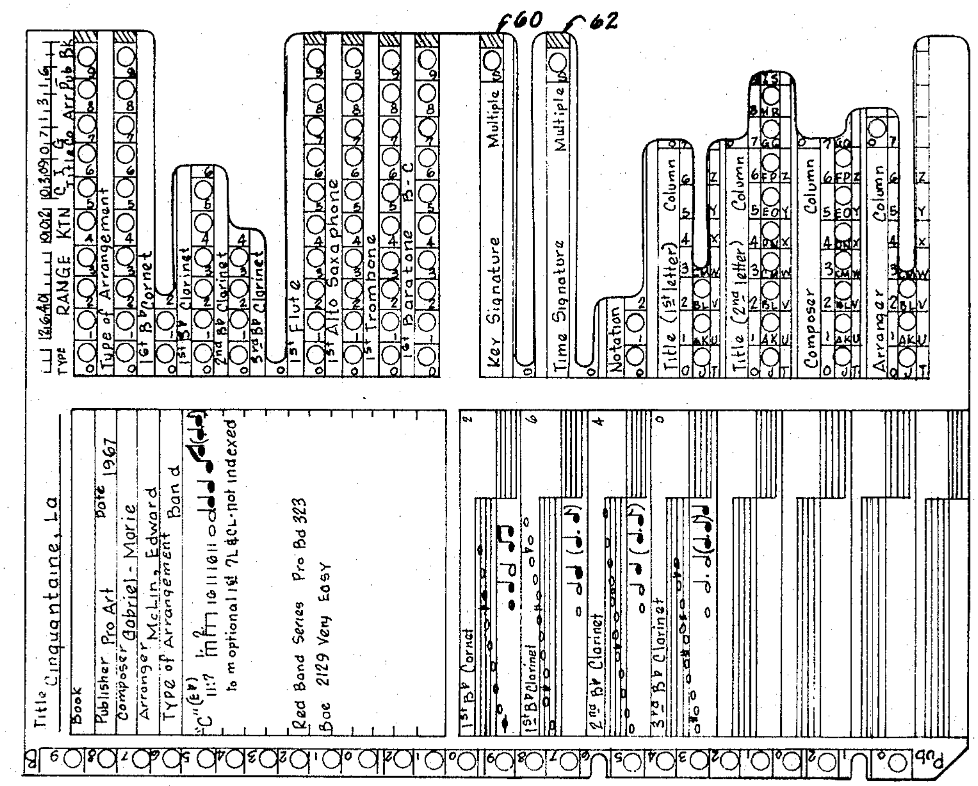
FIG. 2 is a plan view of the face side of a partially completed music index card.

When an index card 10 is completed the apertures are cut out on the opposite edges thereof to form a slat with parallel edges joining the edge of the card. A completed card is shown in FIG. 2 with a piece of music indexed thereon and the apertures cut forming slots. It is to be noted that the music index cards 10 are preferably constructed in a uniform size and with identically positioned columns of apertures. The cards are necessarily substantially identical in overall size so they can be easily slotted and sorted; the sorting will be explained in detail in the hereinafter.

The characteristic information portion of the music index card is indicated at 20 and preferably has eight, sets of stave markings with blank labeling spaces. The characteristic information portion has corresponding columns of apertures indicated at 18, with interspaced labeling spaces 22. This portion is preferably labeled correspondingly for different musical instruments and is used to display the range of notes required for those particular instruments in that particular indexed piece of music; also the apertures are used in conjunction with a range code to index the maximum range of notes to be played by the particular instruments in that particular piece of music. Along with the range of notes played in the particular piece of music the characteristic information portion also indexes the key signature, time signature and rhythmical notation which are items directly connected with the range characteristics.

Figure 6:
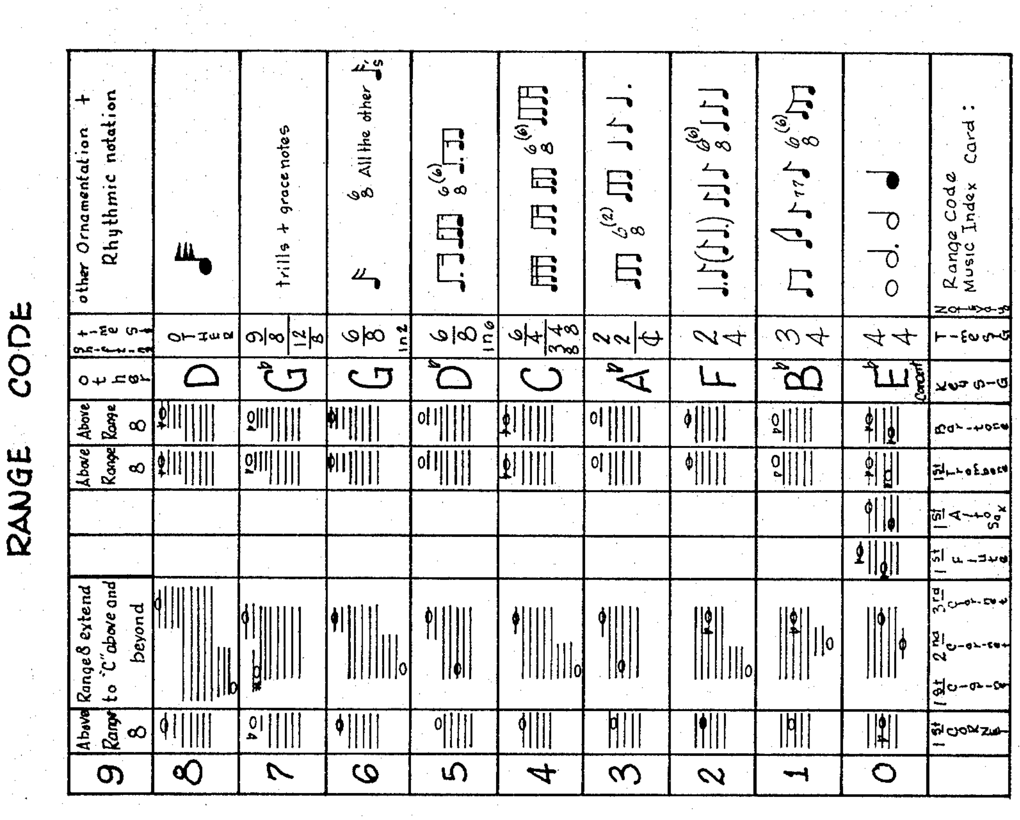
FIG. 6 is a listing of the range levels and specific elements included therein for the specific instruments, key signature, time signature, and rhythmical notation.

A Range Code is shown in FIG. 6; it is designed for use with a school band and has range characteristics separated into 10, levels, 0, to 9. These levels have been found in practice to be most satisfactory for indexing such music because it extends from the basic level where a beginner would be expected to play to an involved level where a concert band would be expected to play. It is to be noted that the characteristic information portion is not to be restricted to just the school band type use but it can be used with the music index card to index similar information for concert orchestras, stringed instruments, such as guitars, the new electronic instruments or any other musical instrument. The specific range code shown in FIG. 6 includes the instruments and positions which usually dictate the ability of a school band to play a particular composition; they are first cornet, first, second and third clarinet, first flute, first alto saxophone, first trombone and baritone. It is to be noted that the range of notes portion of the range code is blank for first flute and first alto sax, this is because it has not been proven in practice what specific groupings of notes are more difficult thus no code is shown for these specific instruments. The range of notes in each level of the code varies for each particular instrument but they range from the easiest notes producable to the more difficult high pitched notes. Note that range level nine, (9), is reserved for anything above range eight, (8), as a practical matter notes in this range are above the ranges not usually included in musical compositions for school bands. As is shown in the range code in FIG. 6 the key signature varies from E flat concert at level zero to D at level eight; the time signature varies from four-four (4/4), at level zero to nine-eight or twelve-eight, (9/8 12/8), at level seven; and the rhythmical notation varies from quarter notes at level zero to one-thirty-second, (1/32) notes at level eight.

The music index card shown in FIG. 2 is partially completed in the characteristic information portion; it has the parts for first cornet, and first, second and third clarinet labeled illustrated on the stave markings and has the slots cut therefor in the corresponding aperture portion 18. In addition to showing the range of notes the stave markings have space for additional notations as shown in the lower spaces relating to specific combinations of the notes shown which may have a bearing on the relative difficulty of that portion of the musical composition. For convenience in identifying the particular range levels they are noted in the upper right hand portion of the stave marking portion for the particular instrument. Also for convenience they are noted in the digital index located in the upper right hand portion of the index card; these ranges levels for the card in FIG. 2 indicated by the numerals 2, 6, 4 and 0. As a practical matter, use of the digital index has been shown in practice to provide a quick way to quickly scan the range information portion for a person familiar with the index code since it is easier distinguished than the plurality of slots and apertures.

When a mass of the music index cards of this invention are completed with information on different musical compositions it provides a library of cards which can be sorted relative to any of the heretofore described information indexed by the apertures. The primary advantage to the music index card system is that when for instance a school band teacher begins teaching a group of students he can use the system to quickly pick music that each student individually can play depending on his ability, and he can pick music that the whole band group can play together depending on the ability of the individual instrument groups. Heretofore a school band teacher or anyone for that matter who wanted music which requires a particular degree of ability to play had to either know of such music from prior experience or had to do a considerable amount of time consuming research to find a piece he could adequately play. The same also holds for a person who has a particular degree of ability with a particular instrument and wishes to find music he can play.

Figure 3:
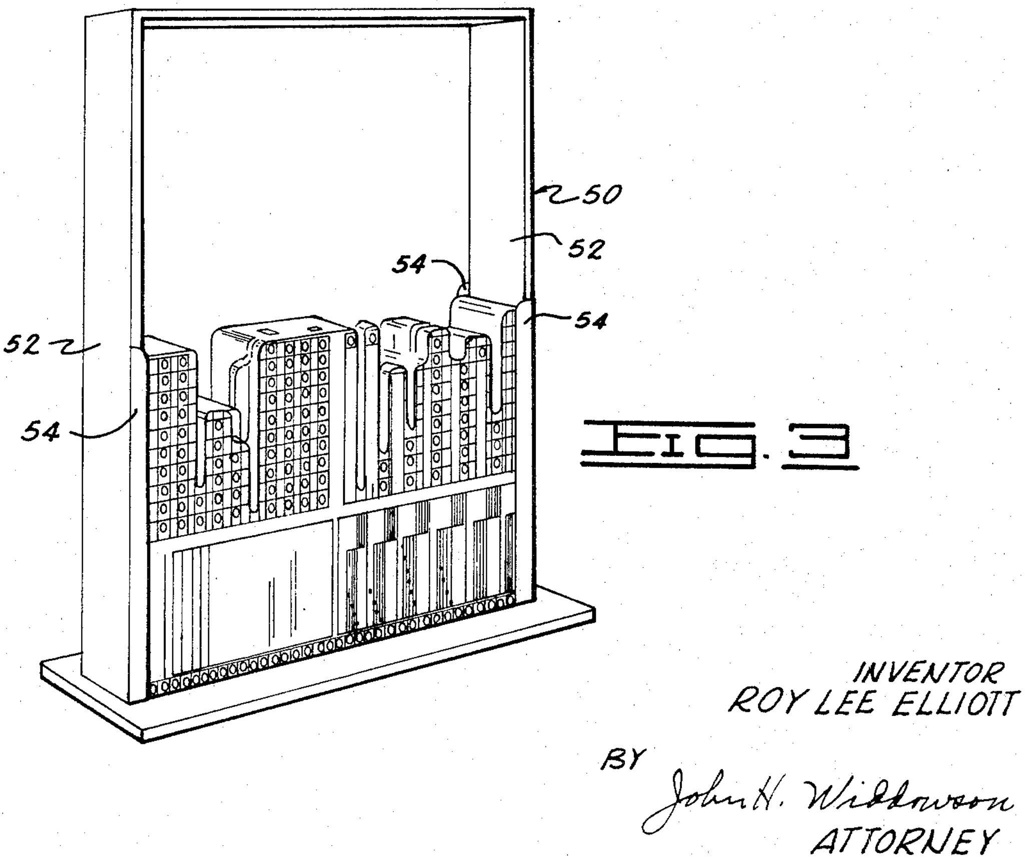
FIG. 3 is a perspective view taken from the face side and above of a quantity of music index cards in a sorting device.

The specific sorting procedure depends on the information the user wishes to find in a mass of music index cards. The mechanics of sorting the music index cards are similar for sorting them regardless of the specific information desired. Specifically, the cards are preferably placed in the sorting frame 50 as shown in FIG. 3 with either of the slotted edges upward. The sorting frame 50 or any other similar frame which prevents transverse movement of the cards is preferred to prevent damage to the cards due to movement should the elongated strip portions become tangled. The sorting frame 50 has vertically upright ends 52 and guide members 54 extending inward a short distance from the ends 52 sufficient to overlap the extreme end portions of the music index cards 10.

Figure 4:
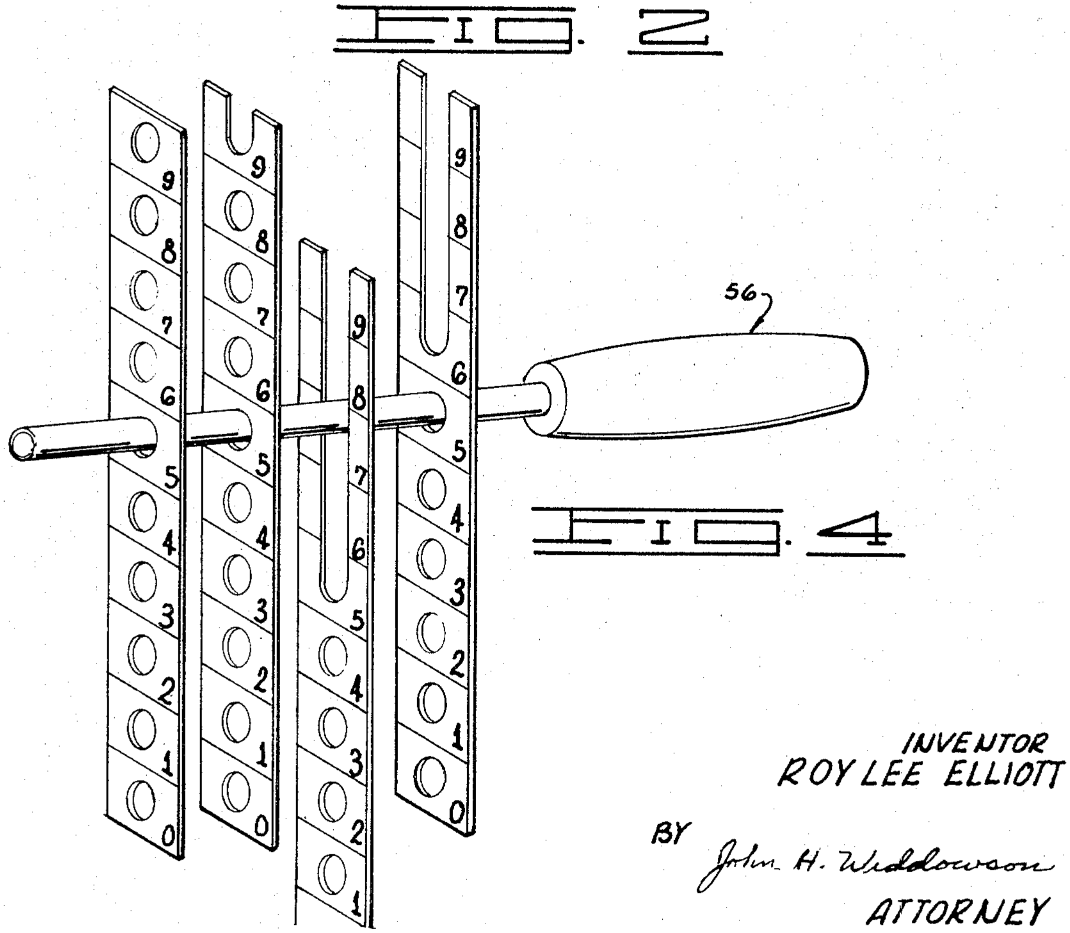
FIG. 4 is a perspective view of several columns of apertures and slots as used in the music index cards with a sorting probe extending therethrough same as in sorting the cards.

When sorting a mass of music index cards for a particular range level a portion of the cards are inserted in the sorting frame 50 as shown in FIG. 3. A probe can then be inserted through the aperture corresponding to the particular level that is desired to be selected. When the probe is lifted vertically the higher range levels are raised and can be taken away; this leaves the range level desired and all those below in the sorting frame. It is to be noted that arrangement of the apertures for the range level characteristics is with the higher range near the edge of the card so when sorting the higher levels are removed leaving the desired level and those below. This is illustrated in FIG. 4; here the range of five, (5), and below desired so the probe 56 is inserted through the apertures of level five, (5). When the probe 56 is lifted vertically the cards not having a slot cut to the depth of the five level are lifted away and the cards having a slot cut to the five level and below are left in place. If the specific five level is desired then after removal of the cards above the five level the probe is inserted at the four level and the five level cards are removed since they are the only remaining cards above the four level. The above described sorting is usable on the range levels for the instruments, key signature, time signature and rhythmical notation; the other portions of the index card must be sorted slightly differently.

In reference to the time and key signatures some musical compositions have several changes in key and time signatures in the piece. In these cases where there is a change in the key or time signature of a piece of music the existence of a multiple key signature is indexed in the aperture portion of the card at the end of the labeled spaces, indicated at 60 and 62, for the key and time signatures respectively. When a single key or time signature is indexed the apertures are cut forming a slot to the edge of the card and the higher level of signature is indexed in the other aperture portion. When a multiple key or time signature is indexed the aperture is left intact. Indexing the signatures in this manner makes this compatible with the system in that when sorted the easier or lower range compositions drop out. When a multiple key or time signature is shown on a music index card the higher is all that is indexed in the apertures and the lower key or time signature is indicated on the general information portion 24 of the card 10 along with the length of the particular measures.

In order to sort a mass of music index cards for the general information characteristics the first letters of the title, composer, arranger, book and publisher are used with the alphabetical code. The title of the musical composition is indexed by the first two, letters, this has been found more convenient in practice due to the large number of compositions. The book, publisher, composer and arranger are indexed by the first letter of their respective names. Use of the alphabetical code as shown in FIG. 5 requires the use of two, columns of apertures to depict the 26, numbers. The preferred column arrangement for the alphabetical code is best illustrated at 34, has one column of apertures numbered 0, 1, 2 which designates the first digit of the alphabetical code and another column of apertures numbered 0, 1, 2, 3, 4, 5, 6, 7, 8, 9 which designate the second number of the alphabetical code. For convenience the second column has the letters corresponding to the letters of the code which are represented by the specific apertures placed beside the apertures.

Sorting a mass of music index cards for a portion of the general information data is a two step procedure. First, specifically the first digit from the alphabetical code is sorted. This will be the number 0, 1, or 2 in the first column of apertures. Next specifically the second digit from the alphabetical code is sorted, this will be a number 0 through 9. Specifically sorting the two digits will separate those cards having only the alphabetical character desired. Once the alphabetical character of the title, name or whatever has been separated the individual separated cards must be examined to find the exact name, title or whatever desired. For instance if a person wants to find some music of a composer by the name Marie Gabriel, the alphabetical code number for the first letter "G" of his last name is "07." The specific digits, 07, are sorted and these music index cards which have a composer whose last name begins with G are separated and then inspected for this particular composer's name. A composition by Marie Gabriel is indexed on the music index card shown in FIG. 2, for illustration.

In the manufacture of the music index cards 10 of this invention, it is obvious they can be easily constructed from stiff card stock, printed with the labeling indicia and punched with the plurality of apertures. The cards 10 are necessarily constructed of material having sufficient strength to withstand continued use and shuffling in a file; they can be constructed of pressed paper material or a plastic material.

In the use and operation of the music index card 10 and filing system therefor of this invention, it is seen that same provides an index card adapted to display general information about a music composition and specific information about the relative difficulty involved in playing it for the several instruments it is written for. The music index card 10 is generally the size of a standard file card, constructed of durable material, has a plurality of columns of apertures therethrough and labels for the musical indicia information.

As will be apparent from the description of the applicant's index card means, relatively inexpensive and simple means has been provided to receive and index musical compositions. The index card is enconomical to manufacture, easily reproduced when completed and when used in mass provides a time saving system for searching many musical compositions for these having particular desired qualities.

It is obvious from the foregoing description of the applicant's index card means that it is not restricted to use for indexing musical data. It can be used to index any data which is variable in mass quantities but has several components groups that each have identifiable overall features. By comparison the component groups of data can be thought of to correspond to the different instrument portions of the music index card and the indentifiable features can be thought of as corresponding to the signatures, notations and other identifying data of the different instrument portions. One possible use of the herein described index card means is an index for electrical components wherein they could be classified as transistors, diodes, integrated circuit modules, etc., by part number, normal function, general amplification characteristics, subcomponents, etc. Other possible uses of the index card means could be made in areas of chemical properties classifications, color and color mixing classifications, machine and subassembly parts classifications, etc.

I claim:

1. An index card and system therefor, comprising:

a. an index card having a portion having a plurality of ordered groups of apertures and slots therethrough and a plurality of corresponding portions for receiving indicia thereon corresponding to said ordered groups of apertures and slots, b. said index card has said slot opening to an edge of said card, c. said index card has another indicia receiving portion adapted to receive further indicia to identify said ordered groups of apertures and slots and the indicia on said first named indicia receiving portions, and d. said index card has a second plurality of groups of apertures and slots adapted by means of a letter code means to identify the indicia on said other indicia receiving portion, e. said index card to have initial indicia thereon and receive further indicia thereon descriptive and representative of a musical score for a band or the like, f. said first named indicia receiving portions have musical stave markings thereon same being a portion of said initial indicia, g. said first named portions having said apertures and said slots has a corresponding relationship to said first named indicia receiving portions and same said portions have means to label same, and h. said other indicia receiving portion has a portion of said initial indicia thereon identify the musical score and has a portion thereof to receive additional notational data indicia thereon relative the musical score, said system is comprised of a plurality of said index cards that have different indicia thereon and have corresponding apertures and slots through same, said index cards being adapted to be positioned upright and sorted by means of a sorting means projecting through a portion of said apertures and said slots, and when moved supporting and separating a portion of said plurality of index cards from the remainder of same.

2. The index card and system as described in claim 1, wherein:

a. said index card is a generally rectangular shaped card, b. said first named portion having said groups of apertures and slots and a portion of said second named groups of apertures and slots are positioned adjacent one edge of said index card adapted to have said slots extending inward from said edge, c. a portion of said second named groups of apertures and slots are positioned on an edge of said index card opposite said first named edge, adapted to have said slots extending inward from said edge, and d. said first named plurality of portions for receiving indicia thereon and said other indicia receiving portion are positioned thereon said index card between said edges and said other portions.

3. The index card and system as described in claim 2, wherein:

a. said means to identify the musical score of said other indicia receiving portion has a portion of said initial indicia, same portion is a plurality of labels and ruled spaces adapted to label the musical score, b. said spaces are to receive identifying indicia the labels include title, book, publisher, composer, arranger, type of arrangement, date, key signature, time signature and notation, and c. said portion to receive additional notational data indicia thereon is positioned adjacent said other indicia receiving portion to receive pertinent indicia data not includable in said other named portions of said index card.

4. The index card and system as described in claim 3, wherein:

a. said second plurality of groups of apertures operable by means of said letter code means to identify the data of said identifying indicia of said spaces, b. said portion of said second plurality of apertures positioned adjacent said first named edge is adapted to identify by means of a number code means the key signature and any multiples thereof, the time signature and any multiples thereof, the type of arrangement, the notation, and identify by means of said letter code the title, the composer, and the arranger, and c. said portion of said second plurality of apertures positioned adjacent said second named edge to identify by means of said letter code the publisher and the book.

5. The index card and system as described in claim 4, wherein:

a. said means to label said first named initial indicia receiving portions is a plurality of groups having said stave markings and having adjacent space to receive indicia labeling each of said portions, b. said first named initial indicia receiving portions are adjacent said other indicia receiving portion and said second named groups of apertures and slots, and c. said means to label said first named portions is a plurality of spaces adjacent each groups of said first named apertures and slots, said spaces of said first named portions are adapted to individually enumerate an instrument playing position relative to the musical score.

6. The index card and system as described in claim 5, wherein:

a. said card has said apertures therethrough arranged in parallel lines positioned perpendicular to said edges, said lines of apertures are to have the connecting portion therebetween same removed forming said slot and joining said edge, and b. the number of said apertures connected forming said slot is determined by said number code.

* * * * *